(12) United States Patent
Liu et al.

(10) Patent No.: US 11,543,530 B1
(45) Date of Patent: Jan. 3, 2023

(54) INDOOR SLAM METHOD BASED ON 3D LIDAR AND UWB

(71) Applicant: Guangdong University of Technology, Guangzhou (CN)

(72) Inventors: Jianqi Liu, Guangzhou (CN); Ouyu Wang, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 0 days.

(21) Appl. No.: 17/826,794

(22) Filed: May 27, 2022

(30) Foreign Application Priority Data

Aug. 6, 2021 (CN) .......................... 202110900474.1

(51) Int. Cl.
*G01S 17/86* (2020.01)
*G01S 17/894* (2020.01)

(52) U.S. Cl.
CPC ............ *G01S 17/86* (2020.01); *G01S 17/894* (2020.01)

(58) Field of Classification Search
None
See application file for complete search history.

(56) References Cited

U.S. PATENT DOCUMENTS

2022/0187841 A1* 6/2022 Ebrahimi Afrouzi ....................... G05D 1/0272

OTHER PUBLICATIONS

First Office Action issued in counterpart Chinese Patent Application No. 202110900474.1, dated Mar. 23, 2022.

\* cited by examiner

*Primary Examiner* — Hovhannes Baghdasaryan
(74) *Attorney, Agent, or Firm* — Westbridge IP LLC (57) ABSTRACT

Disclosed is an indoor SLAM method based on three-dimension (3D) lidar and ultra-wide band (UWB). Firstly, a UWB positioning system is deployed in an indoor area, then a robot carrying 3D lidar sensors explores the indoor area, and finally, a SLAM algorithm integrating lidar data and UWB data is used to generate a map of the explored area. The method specifically includes the following steps: determining a relative pose transformation between the 3D laser SLAM coordinate system and the UWB positioning coordinate system; using UWB data to provide initial value for inter-frame matching of laser odometer; using UWB data to add constraints to SLAM back-end pose graph; and performing loop detection based on curvature feature coding. This application breaks through the limitation of lighting conditions of indoor areas, eliminates the accumulated errors of SLAM, and constructs a high-quality indoor map.

3 Claims, 6 Drawing Sheets

(Prior Art)

FIG. 8

INDOOR SLAM METHOD BASED ON 3D LIDAR AND UWB

CROSS-REFERENCE TO RELATED APPLICATIONS

This application claims priority to Chinese Patent Application No. 202110900474.1, filed on Aug. 6, 2021, the contents of which are hereby incorporated by reference.

TECHNICAL FIELD

This application relates to the technical field of state estimation and map construction, in particular to an indoor simultaneous localization and mapping (SLAM) method based on three-dimension (3D) lidar and ultra-wide band (UWB).

BACKGROUND

Indoor mapping technology has been widely used in modern society, especially in logistics, rescue, military affairs, security and other fields. There are many ways to construct indoor maps, which may be classified from static and dynamic perspectives.

A static method is mainly to statically deploy sensors with a ranging function such as a lidar or visual camera in various sub-areas of current indoor environments in a fixed indoor area; then, independent sensor data of each sub-area is used to construct a corresponding map of the sub-area; and finally, the sub-maps of each sub-area are spliced according to the spatial position relationship of each independent sensor to obtain an integrated indoor map.

A static indoor map construction method has the advantages of good simplicity and accuracy. However, the static method requires multiple sensors to be deployed in different areas and costs a lot. This method also takes a lot of time and manpower to splice multiple sub-maps, so it is not suitable for emergencies such as exploration and rescue, military affairs, etc.

Dynamic indoor map construction is mainly based on simultaneous localization and mapping (SLAM). When people or robots carrying sensors are exploring indoor areas freely, the map of the explored area may be quickly generated by using real-time sensor data and SLAM algorithm. Meanwhile, a current position in the map and historical track of sensors are also determined. Using SLAM technology to construct indoor maps has advantages of a fast speed, good flexibility and low costs.

In SLAM, map construction and real-time positioning are complementary. On one hand, only by realizing accurate positioning may the current sensor data (such as 3D laser point cloud data containing spatial ranging information) be projected from the current sensor coordinate system into the map coordinate system, and then the generated map information may be updated. On the other hand, accurate map data and current real-time sensor data need data association to realize accurate sensor positioning. Therefore, it is of great importance to control the positioning error of SLAM process; otherwise accumulated errors will occur and ultimately the accuracy of indoor map construction will be affected negatively In addition, using SLAM technology to construct a map also needs to consider the selection of appropriate sensor equipment. On one hand, the indoor environment may be affected by lighting conditions, so the operation of visual cameras as sensors may be severely restricted; on the other hand, due to the occlusion of indoor environment, it is impossible to eliminate SLAM cumulative errors by fusing Global Positioning System (GPS) data.

SUMMARY

An objective of this application is to overcome the shortcomings of the prior art, provide an indoor SLAM method based on 3D lidar and UWB, break through the limitation of lighting conditions of indoor areas, and eliminate the accumulated errors of SLAM, so as to construct high-quality indoor maps.

To achieve the above objective, this application provides the following technical solutions.

This application relates to an indoor SLAM method based on 3D lidar and UWB, which includes the following steps: deploying a UWB positioning system in an indoor area, exploring the indoor area through a robot carrying 3D lidar sensors, and generating a map of the explored area by using a SLAM algorithm integrating lidar data and UWB data.

The method specifically includes the following steps:

S1, determining a relative pose transformation between a 3D laser SLAM coordinate system and a UWB positioning coordinate system;

S2, using UWB data to provide initial value for inter-frame matching of laser odometers;

S3, using UWB data to add constraints to SLAM back-end pose graph; and

S4, performing loop detection based on curvature feature coding.

Further, the specific process of determining the relative pose transformation between the 3D laser SLAM coordinate system and the UWB positioning coordinate system in the S1 is as follows:

S1-1, placing a UWB tag node on a 3D lidar, regarding the two sensors as coincident, and the lidar carrying the two sensors to explore in the indoor environment;

S1-2, before integrating UWB data into SLAM algorithm, using UWB positioning algorithm and SLAM only using laser data, respectively, in the envelope area formed by each UWB base station node, and obtaining coordinate point sets $P_U$ and $P_L$ of the three-dimensional motion trajectory of the sensor in UWB coordinate system (U) and 3D laser SLAM coordinate system (L):

$$P_U = \{p_k^U = (x_k^U, y_k^U, z_k^U) | k=1,2,3 \ldots m\} \quad (1)$$

$$P_L \{p_k^L = (x_k^L, y_k^L, z_k^L) | k=1,2,3 \ldots n\} \quad (2)$$

in formula (1) and formula (2), $(x_k^U, y_k^U, z_k^U)$ and $(x_k^L, y_k^L, z_k^L)$ are the corresponding three-dimensional motion trajectory coordinate points;

S1-3, in accordance with a same time stamp, uniformly sample p points from the two coordinate points sets of the three-dimensional motion trajectory obtained in the S1-2 to form two point sets as follows: UWB positioning sampling point set $X_U$ and 3D laser SLAM positioning sampling point set $X_L$:

$$X_U = \begin{bmatrix} x_1^U & \ldots & x_p^U \\ y_1^U & \ldots & y_p^U \\ z_1^U & \ldots & z_p^U \end{bmatrix} \quad (3)$$

$$X_L = \begin{bmatrix} x_1^L & \dots & x_p^L \\ y_1^L & \dots & y_p^L \\ z_1^L & \dots & z_p^L \end{bmatrix} \quad (4)$$

in formulas (3) and (4), each column in the matrix is the corresponding coordinate point of the three-dimensional motion track;

S1-4, thinning the two point sets $X_U$ and $X_L$ sampled in the S1-3; and

S1-5, using the two point sets $X_U$ and $X_L$ obtained in the S1-4, according to Umeyama, obtaining the relative pose transformation between UWB coordinate system (U) and 3D laser SLAM coordinate system (L).

Further, the specific process of sampling the coordinate point sets $P_U$ and $P_L$ of the three-dimensional motion trajectory according to the time stamp is as follows:

adopting linear interpolation method, aiming at the time stamp $t_k$ of each extracted SLAM positioning coordinate point$_L(t_k) \in P_L$, and calculating a corresponding UWB positioning coordinate point$_U(t_k)$ from $P_L$ sampling:

$$point_U(t_k) = \begin{cases} point_U(t_d), & |t_d - t_k| \leq t_{min} \\ point_U(t_1) + \dfrac{point_U(t_2) - point_U(t_1)}{(t_2 - t_1)} \times (t_k - t_1), & (t_1 < t_k < t_2) \end{cases} \quad (5)$$

in formula (5), $t_{min}$ is the minimum time difference threshold, and when $|t_d - t_k| \leq t_{min}$ is satisfied, it is considered that time $t_d$ and $t_k$ are close enough; $t_1$ and $t_2$ are the two timestamps required by linear interpolation when $t_{min}$ threshold is not met.

Further, the specific process of S1-5 is as follows:

S1-5-1, finding mean values $X_{U,mean}$ and $X_{L,mean}$ of the two point sets of formulas (3) and (4), and performing coring operation on the two matrices, subtracting the corresponding mean values from each column to obtain corresponding matrices $\overline{X}_U$ and $\overline{X}_L$;

S1-5-2, performing singular value decomposition on the matrix $\overline{X}_L \overline{X}_U^T$:

$$\overline{X}_L \overline{X}_U^T = UDV^T \quad (7);$$

S1-5-3, finding the eigenvalues of matrix $\overline{X}_L \overline{X}_U^T$, and selecting the corresponding S matrix according to the range of eigenvalues:

$$S = \begin{cases} I & \text{if } \det(\overline{X_L X_U}^T) \geq 0 \\ \text{diag}(1, 1, -1) & \text{if } \det(\overline{X_L X_U}^T) < 0 \end{cases} \quad (8)$$

in formula (8), I is identity matrix; and

S1-5-4, finding the pose transformation between two coordinate systems, including a rotation matrix R and a displacement vector $t_l$:

$$R = USV^T \quad (9)$$

$$t_l = x_{U,mean} - R x_{L,mean} \quad (10);$$

projecting a point located in UWB coordinate system to 3D laser SLAM coordinate system:

$$\begin{pmatrix} x_k^L \\ y_k^L \\ z_k^L \end{pmatrix} = R \begin{pmatrix} x_k^U \\ y_k^U \\ z_k^U \end{pmatrix} + t_l, \ (k = 1, 2, 3\dots) \quad (11)$$

in accordance with formula (11), obtaining data including coordinates of UWB positioning track and coordinates of UWB base station in 3D laser SLAM coordinate system.

Further, in the S2, UWB positioning positions $X_{T1}$ and $X_{T2}$ corresponding to two adjacent laser point cloud frames given by UWB positioning are used to calculate the spatial distance between the two positions, so as to obtain an initial value of the displacement component of pose transformation between the two frames: $tr = x_{T2} - X_{T1}$.

Further, in the S3, the specific process of adding constraints to SLAM back-end pose graph by using UWB data is as follows:

using the obtained rotation matrix R and displacement vector $t_l$, the UWB base station nodes located in the UWB coordinate system are projected into the 3D laser SLAM coordinate system, and the coordinates of each UWB base station node in the 3D laser SLAM coordinate system are obtained;

in the process of exploring indoor areas, UWB tag nodes will communicate with UWB base station nodes in real time.

If the position of the current sensor is in the envelope surface formed by each UWB base station node, a position coordinate $x_{uwb}$ calculated by the UWB system is added to the SLAM back-end pose graph as a positioning observation constraint:

$$e_1 = \|x_{uwb} - x_t\| \quad (13)$$

in formula (13), $x_t$ is the position component of SLAM key frame pose $P_t$ at time t.

If the position of the current sensor is outside the envelope area formed by each UWB base station node, it will be handled as follows:

obtaining ranging information; and then according to the requirements of UWB signal strength threshold and distance threshold between the mobile tag and the base station, filtering the original ranging information:

$$d_t = (d_1, d_2, \dots d_j)^T \quad (14)$$

in formula (14), $d_t$ represents the measurement distance between the mobile tag node and j effective base station nodes at time t.

A nearest base station coordinate $x_{mean}$ measured at time t is added to the back-end pose graph of SLAM as a road sign, and according to a measured distance $d_{mean}$ observation constraint is constructed for the pose $P_t$ of SLAM key frame at time t, which is used to optimize the back-end map:

$$e_2 = \|d_{mean} - \hat{d}\| \quad (15)$$

in which, $$\hat{d} = \|x_{mean} - x_t\| \quad (16);$$

$e_1$ and $e_2$ are UWB observation constraints.

Further, the loop detection is performed in S4 based on curvature feature coding, including the following steps:

traversing a key frame point cloud, calculating the curvature of each point in this frame point cloud, and marking the curvature as C:

$$C = \frac{\lambda}{|K| \|d_i\|} \left\| \sum_{j \in K, j \neq i} (d_i - d_j) \right\| \quad (20)$$

in formula (20), K represents the laser point set located on the left and right sides of the same row as the current laser point$_i$, $r_i$ represents the distance from the point$_i$ to the lidar center O, $d_j$ represents the distance from the other points except point$_i$ in set K to the lidar center O, and λ represents the scale coefficient, which is adjusted according to the actual K set, so that the calculated curvature is within a fixed interval.

Filtering and rounding the curvature according to threshold:

$$C = \begin{cases} 0, & \text{if } C \leq C_{threshold} \\ \text{ROUND}(C), & \text{if } C > C_{threshold} \end{cases} \quad (21)$$

in formula (21), $C_{threshold}$ is the set threshold.

Dividing the three-dimensional space where the key-frame point cloud is located according to the resolution of the horizontal plane to obtain N sub-areas:

$$N = 2\pi \frac{(L1 - L2)}{\alpha l} \quad (22)$$

in formula (22), L1 and L2 represent the maximum distance and the minimum distance from the lidar center O on the horizontal plane respectively; a is the angular interval, and l is the radial unit length.

Generating a coding matrix M with a specification of $$\frac{2\pi}{\alpha} \times \frac{(L1 - L2)}{l}$$

according to the divided spatial region, where each element value of the coding matrix M is the largest curvature value C in the corresponding sub-region; filling the sub-area without point cloud to the corresponding position of the matrix with the value of 0.

In the process of SLAM algorithm running, the corresponding coding matrix M of each generated key frame is stored in the database;

when SLAM algorithm detects whether there is a looping situation according to the current key frame, searching a coding matrix database of historical key frames for a coding matrix most similar to the coding matrix of the current key frame;

the process includes:

generating an encoding column vector v with the same number of rows for the encoding matrix M, where each element in the vector is the maximum value Cmax of the elements of the corresponding row of the matrix;

when searching candidate matrices in the coding matrix database, first comparing similarity of column vector v:

$$\text{diff} = \|v_{current} - V_{select}\| \quad (23)$$

in formula (23), $V_{current}$ represents the coding column vector corresponding to the coding matrix of the key frame at the current moment, and $v_{select}$ represents the coding column vector corresponding to the coding matrix of the candidate key frame; when diff is less than the set threshold, the coding matrix $M_{select}$ corresponding to the candidate key frame maybe preliminarily selected.

then, determining the number of column shifts shift between $M_{select}$ and the coding matrix $M_{current}$ of the key frame at the current moment. The way to calculate the shift is to randomly select a column vector from $M_{current}$, where the column is marked as $j_{current}$; and then traversing each column vector in $M_{select}$ to find the most similar column vector, where the column is marked as $j_{select}$, as follows:

$$\text{shift} = j_{select} - i_{current} \quad (25);$$

then translating $M_{select}$ according to shift to obtain $M_{select}$ $\overline{M_{select}}$.

Comparing a similarity s of $M_{select}$ $\overline{M_{select}}$, and $M_{current}$ matrices:

$$s = \sum_i \|\beta_i^{current} - \beta_i^{select}\| \quad (26)$$

in formula (26), $\beta_i^{current}$ and $\beta_i^{select}$ are one of the column vectors of the corresponding coding matrices. When s meets the condition less than the set threshold, it is considered that the key frame point clouds corresponding to the two coding matrices are similar, the position of the current key frame is close to that of the candidate historical key frame, thus realizing the position recognition function and meeting the condition of adding loop constraint.

Carrying out a point cloud matching between the current key frame point cloud and the found historical key frame point cloud, obtaining the relative pose transformation between the two key frame radar coordinate systems, and adding the pose transformation to the SLAM back-end pose graph as a constraint.

Compared with the prior art, the principle and advantages of this scheme are as follows.

1) Based on the conventional 3D laser SLAM, the relatively reliable UWB sensor data is fused in the indoor area, which provides the matching initial value for the laser odometer of the laser SLAM and is conducive to rapid convergence; moreover, reliable observation constraints are added to the back-end pose graph of SLAM, which makes up for the lack of GPS observation constraints in indoor areas, and helps to reduce the accumulated error of indoor 3D laser SLAM; especially in the conditions where loop detection is not possible (the accumulated error caused by laser odometer will be increasingly larger if effective loop detection constraints cannot be provided), UWB observation constraints may improve the positioning accuracy and robustness of the algorithm, and thus further improving the accuracy of indoor maps constructed by laser SLAM.

2) Before the laser SLAM algorithm is used, it is not necessary to obtain the spatial position of each deployed UWB base station node relative to the lidar at the initial time by means of measurement (it is not necessary to obtain the pose transformation between the UWB coordinate system and the initial laser SLAM coordinate system by means of manual measurement before the algorithm); after the algorithm runs, the relative pose transformation between the two coordinate systems may be obtained according to the obtained trajectory coordinate points of laser SLAM and UWB positioning, so that UWB data such as UWB base station coordinates can be projected into the laser SLAM coordinate system for use. This can fully adapt to different indoor use scenarios, without manual measurement, saving manpower and time, especially in emergency situations.

3) The loop detection method based on the curvature characteristics of laser point cloud avoids the disadvantages caused by the traditional laser SLAM direct loop detection only based on the key frame position; this method makes full use of the spatial information of the current key-frame point cloud and the historical key-frame point cloud, realizes more accurate loop detection by means of place recognition, and may add more reliable loop constraints to the SLAM back-end pose graph, thus reducing the accumulated error of laser SLAM and further improving the accuracy of the indoor map. In addition, the feature coding matrix based on point cloud curvature and spatial information proposed in this scheme is beneficial to data storage and improves the search efficiency of candidate key frames.

BRIEF DESCRIPTION OF THE DRAWINGS

In order to more clearly explain the embodiments of the present application or the technical solutions in the prior art, the following will briefly introduce the services that need to be used in the description of the embodiments or the prior art. Obviously, the drawings in the following description are only some embodiments of the present application. For those of ordinary skill in the art, other drawings may be obtained according to these drawings without any creative effort.

DETAILED DESCRIPTION OF THE EMBODIMENTS

The application will be further explained with reference to the following specific examples.

Figure 1:
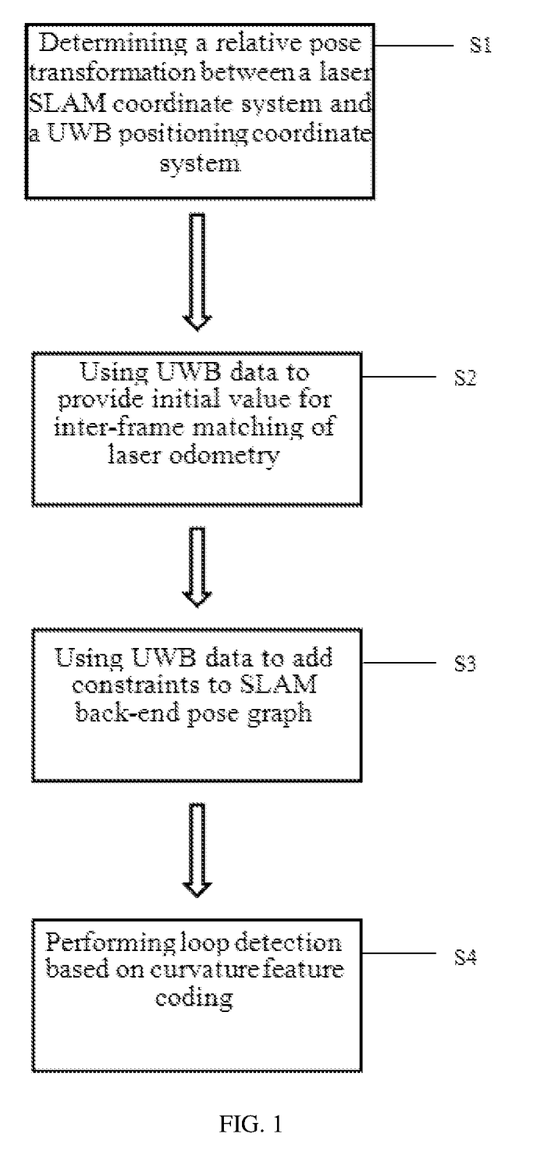
FIG. 1 is the principle flow chart of an indoor SLAM method based on 3D lidar and UWB in an embodiment of the present application.
Figure 2:
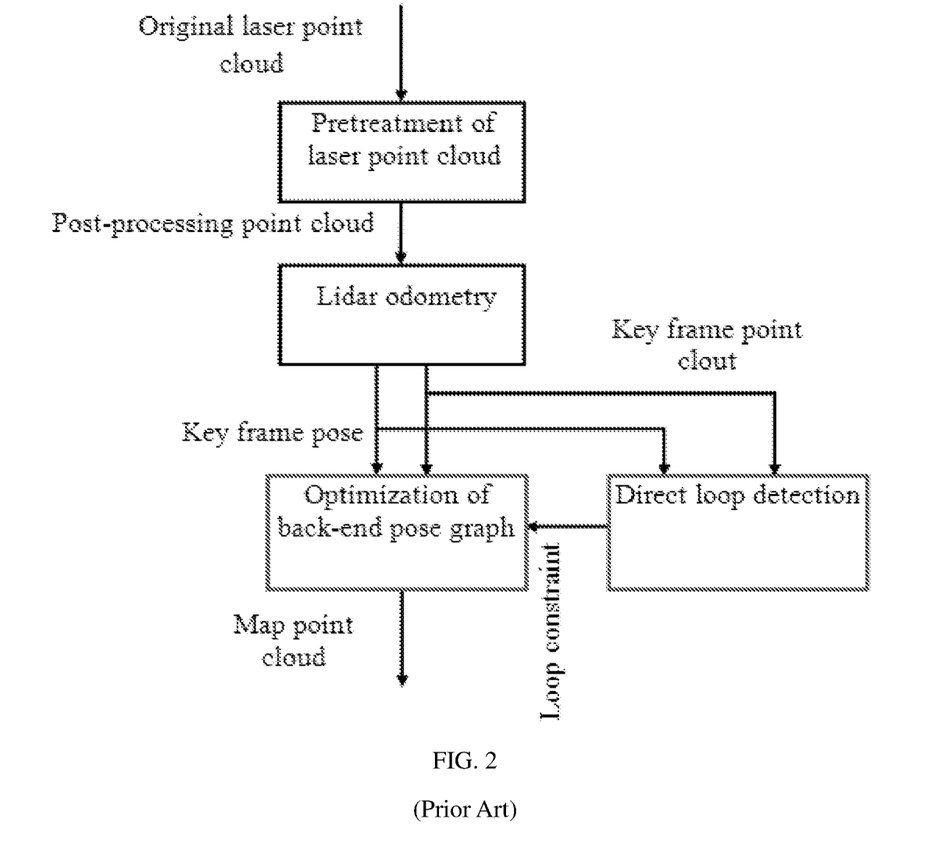
FIG. 2 is a frame diagram of SLAM algorithm of traditional lidar.
Figure 3:
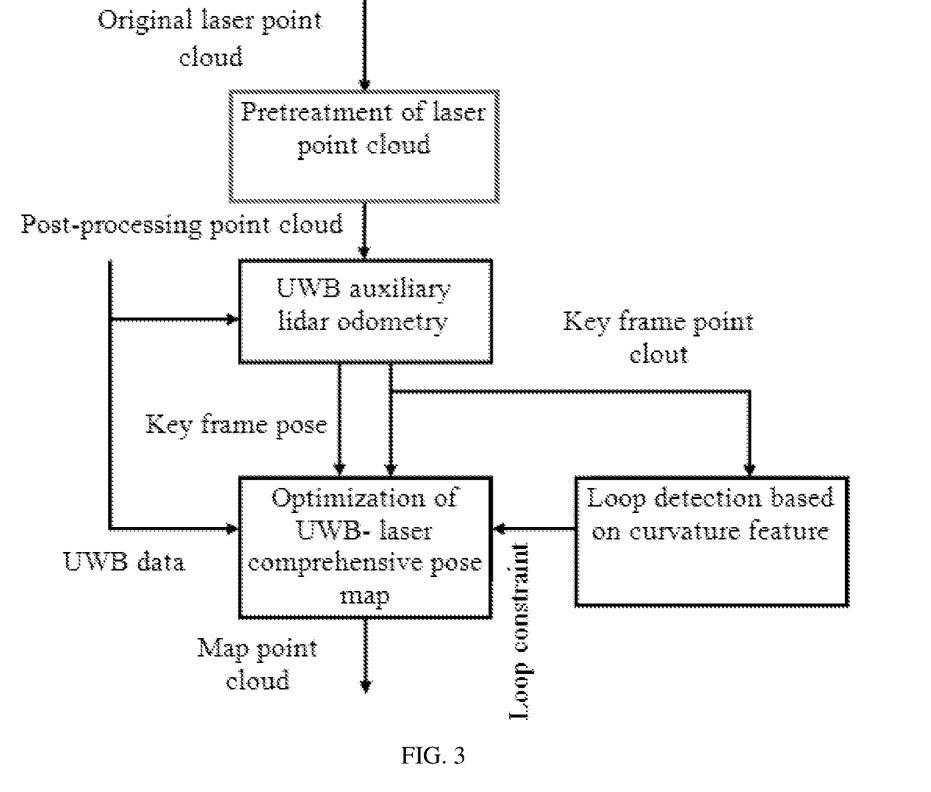
FIG. 3 is a frame diagram of SLAM algorithm proposed in an embodiment of the present application.

As shown in FIG. 1, FIG. 2 and FIG. 3, an indoor SLAM method based on 3D lidar and UWB in this embodiment deploys UWB positioning system in an indoor area, explores the indoor area through a robot carrying 3D lidar sensors, and generates a map of the explored area by using SLAM algorithm integrating lidar data and UWB data.

The method specifically includes the following steps.

S1, determining a relative pose transformation between a 3D laser SLAM coordinate system and a UWB positioning coordinate system.

In this embodiment, the UWB positioning system is deployed in an indoor area, and the indoor area is explored by people or robots carrying 3D lidar sensors, and the SLAM algorithm that fuses lidar data and UWB data is used to generate a map of the explored area.

The UWB positioning system contains a number of sensor nodes, which are mainly divided into two roles: fixed base station nodes and movable tag nodes. After the coordinates of the base station nodes are initialized, the coordinates of the tag nodes in UWB global coordinate system may be calculated according to the ranging information between the tag and each base station.

In order to integrate UWB data into 3D laser SLAM algorithm, it is necessary to determine the relative pose transformation between SLAM coordinate system and UWB coordinate system before the system runs. Then, the calculated data of UWB can be projected from UWB coordinate system to laser SLAM coordinate system for fusion.

Generally, the SLAM coordinate system may be set as the 3D lidar coordinate system at the initial time. Therefore, the distance information between 3D lidar and each base station node of UWB may be measured at the initial time, and a pose transformation between UWB coordinate system and laser SLAM coordinate system can be obtained.

In practical applications, however, in most cases, people can't know exactly where each base station node is placed and can't manually specify the coordinates. At the same time, there is also a lack of means to measure the spatial relative geometric information between 3D lidar and each base station node, and the UWB coordinate system may only be initialized by the ranging information between each base station node, while the relative pose transformation between 3D lidar coordinate system and UWB coordinate system at the initial time cannot be obtained.

Figure 7:
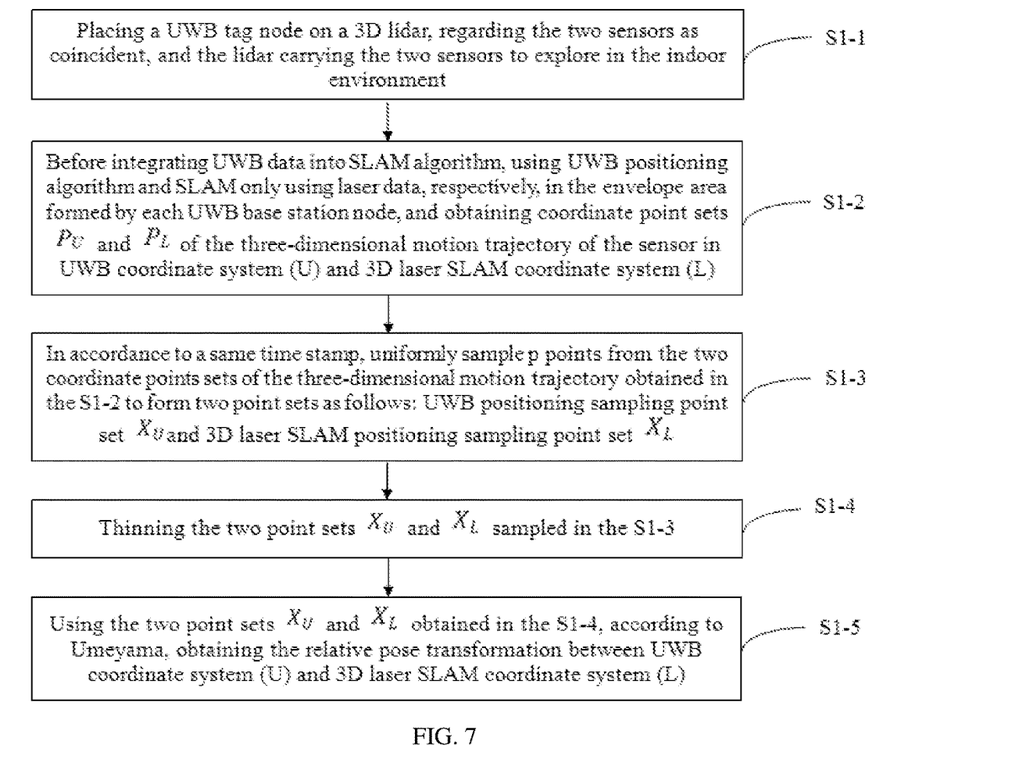
FIG. 7 is a flowchart of determining a relative pose transformation between 3D laser SLAM coordinate system and UWB positioning coordinate system in S1.

As shown in FIG. 7, in view of the fact that the relative pose transformation between UWB coordinate system and 3D laser SLAM coordinate system is unknown in advance, this embodiment provides the following solution.

S1-1, placing a UWB tag node on a 3D lidar, regarding the two sensors as coincident, and the lidar carrying the two sensors to explore in the indoor environment.

Figure 4:
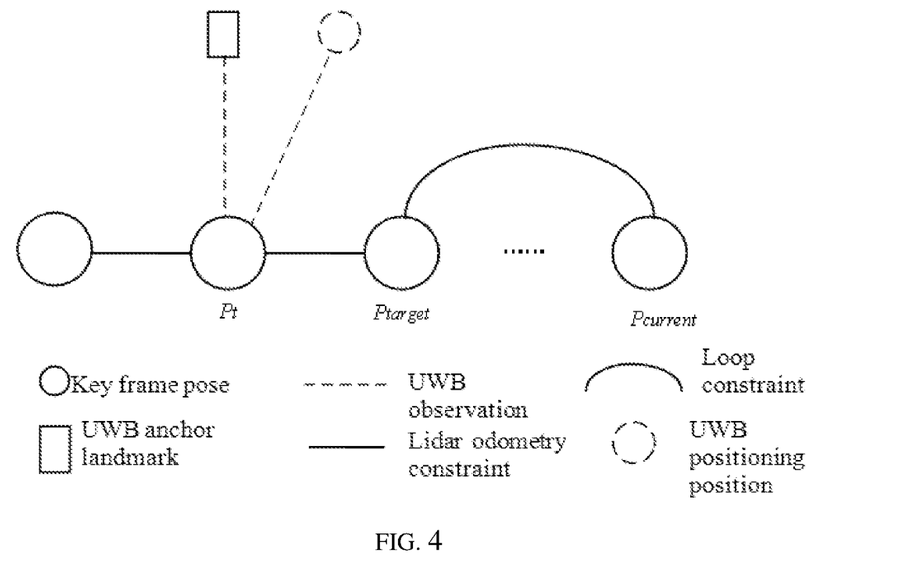
FIG. 4 is a schematic diagram of track point sampling proposed in an embodiment of the present application.

S1-2, before integrating UWB data into SLAM algorithm, using UWB positioning algorithm (such as TOA algorithm) and SLAM only using laser data, respectively, to obtain coordinate point sets $P_U$ and $P_L$, of the three-dimensional motion trajectory of the sensor in UWB coordinate system (U) and 3D laser SLAM coordinate system (L) in the envelope area composed of each UWB base station node (as shown in FIG. 4, the dotted line area surrounded by the UWB base station nodes are represented by A0-A3).

$$P_U = \{p_k^U = (x_k^U, y_k^U, z_k^U) | k=1,2,3 \ldots m\} \quad (1),$$

$$P_L = \{p_k^L = (x_k^L, y_k^L, z_k^L) | k=1,2,3 \ldots n\} \quad (2),$$

in formulas (1) and (2), $(x_k^U, y_k^U, z_k^U)$ and $(x_k^L, y_k^L, z_k^L)$ are the corresponding coordinate points of the three-dimensional motion trajectory.

In FIG. 4, $O_U$ represents the origin of UWB positioning coordinate system, and OL represents the origin of SLAM coordinate system. Because the 3D lidar and UWB tag nodes of this embodiment are placed together, the nodes may be seen as coincident, and the motion trajectories thereof are consistent.

S1-3, after obtaining enough points, the two coordinate point sets PU and PL uniformly sample p points from the two three-dimensional motion trajectory coordinate point sets obtained in the S1-2 according to the same time stamp to form the following two point sets: UWB positioning sampling point set $X_U$ and 3D laser SLAM positioning sampling point set $X_L$:

$$X_U = \begin{bmatrix} x_1^U & \ldots & x_p^U \\ y_1^U & \ldots & y_p^U \\ z_1^U & \ldots & z_p^U \end{bmatrix}, \quad (3)$$

$$X_L = \begin{bmatrix} x_1^L & \dots & x_p^L \\ y_1^L & \dots & y_p^L \\ z_1^L & \dots & z_p^L \end{bmatrix}, \quad (4)$$

in formulas (3) and (4), each column of data in the matrix is a corresponding coordinate point of the three-dimensional motion track.

The specific method of sampling the above two point sets according to the time stamp is as follows.

A working frequency of 3D lidar (generally 10 Hz) is lower than that of UWB positioning, and SLAM adopts the pose graph optimization based on key frames, the output track point frequency will be lower (such as 1 Hz). Therefore, this embodiment adopts the linear interpolation method, aiming at a time stamp $t_k$ of each extracted SLAM positioning coordinate point point$_L(t_k) \in P_L$, and calculates the corresponding UWB positioning coordinate point$_U(t_k)$ from $P_L$ sampling:

$$point_U(t_k) = \begin{cases} point_U(t_d), & |t_d - t_k| \le t_{min} \\ point_U(t_1) + \dfrac{point_U(t_2) - point_U(t_1)}{(t_2 - t_1)} \times (t_k - t_1), & (t_1 < t_k < t_2) \end{cases}, \quad (5)$$

in formula (5), $t_{min}$ is the minimum time difference threshold, and when $|t_d - t_k| \le t_{min}$ is satisfied, it is considered that time $t_d$ and $t_k$ are close enough; $t_1$ and $t_2$ are the two timestamps required by linear interpolation when $t_{min}$ threshold is not met.

S1-4, the above work completes the alignment and sampling of two point sets according to time. Further, in order to improve the accuracy of the relative pose transformation between the image coordinate systems obtained subsequently, this embodiment also considers the uniform distribution of the above-mentioned point sets in the space where they are located, and it is necessary to further carry out thinning processing on the two point sets $X_U$ and $X_L$ sampled in the S1-3; the distance between two adjacent sampling points in time should be greater than the set threshold:

$$|point(k) - point(k+1)| \ge d_{threshold} \quad (6),$$

in formula (6), $d_{threshold}$ is the set distance threshold.

Figure 8:
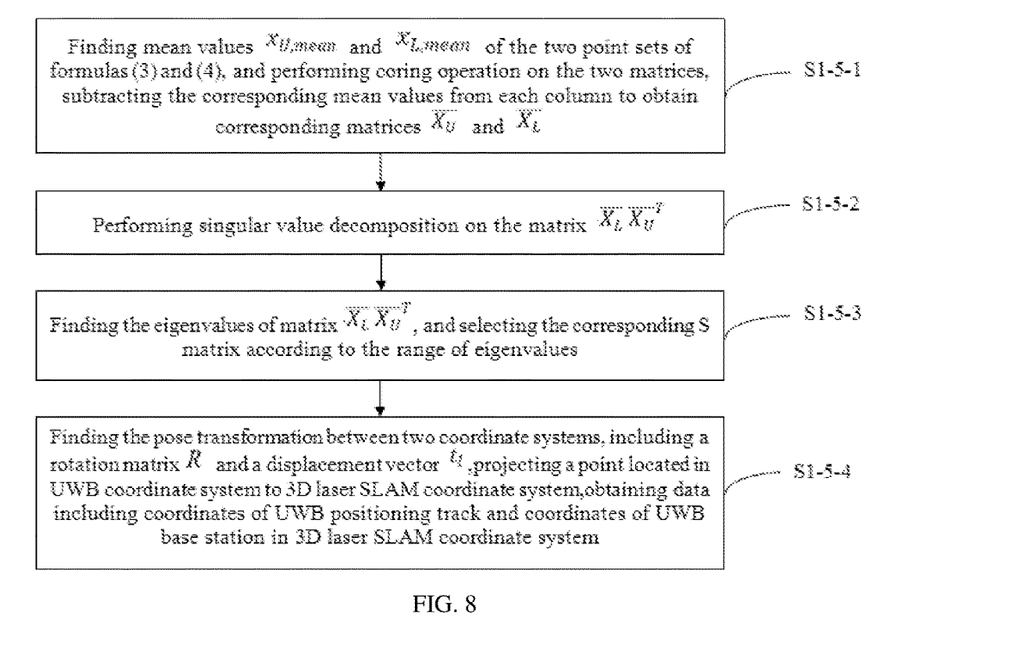
FIG. 8 is a flowchart of S1-5 in FIG. 7.

S1-5, using the two point sets $X_U$ and $X_L$ obtained in the S1-4, according to Umeyama theorem, the relative pose transformation between UWB coordinate system (U) and 3D laser SLAM coordinate system (L) is obtained, and as shown in FIG. 8, the specific process is as follows:

S1-5-1, finding mean values $X_{U,mean}$ and $X_{L,mean}$ of the two point sets in formulas (3) and (4), and performing coring operation on the two matrices, subtracting the corresponding mean values from each column to obtain corresponding matrices $\overline{X}_U$ and $\overline{X}_L$;

S1-5-2, performing singular value decomposition on the matrix $\overline{X}_L \overline{X}_U^T$:

$$\overline{X}_L \overline{X}_U^T = UDV^T \quad (7);$$

S1-5-3, finding the eigenvalues of matrix $\overline{X}_L \overline{X}_U^T$, and selecting the corresponding S matrix according to the range of eigenvalues:

$$S = \begin{cases} I & \text{if } \det(\overline{X}_L \overline{X}_U^T) \ge 0 \\ \text{diag}(1, 1, -1) & \text{if } \det(\overline{X}_L \overline{X}_U^T) < 0 \end{cases}, \quad (8)$$

in formula (8), 1 is identity matrix; and

S1-5-4, finding the pose transformation between two coordinate systems, including the rotation matrix R and the displacement vector $t_l$:

$$R = USV^T \quad (9),$$

$$t_l = x_{U,mean} - R x_{L,mean} \quad (10).$$

Projecting a point located in UWB coordinate system to 3D laser SLAM coordinate system:

$$\begin{pmatrix} x_k^L \\ y_k^L \\ z_k^L \end{pmatrix} = R \begin{pmatrix} x_k^U \\ y_k^U \\ z_k^U \end{pmatrix} + t_l, (k = 1, 2, 3 \dots). \quad (11)$$

According to formula (11), obtaining data including the coordinates of UWB positioning track and UWB base station in 3D laser SLAM coordinate system.

S2, using UWB data to provide initial value for interframe matching of laser odometer.

In 3D laser SLAM, a task of laser odometer is to match the laser point clouds of two adjacent frames, so as to obtain the pose transformation of the sensor between the two frames.

Generally, the point cloud matching algorithms used by laser odometer mainly include ICP, NDT and LOAM algorithm based on feature points. No matter which algorithm is adopted, when matching between frames, the convergent matching results must be obtained within the working period of 3D lidar.

In order to shorten the matching time and achieve convergence quickly, one solution is to provide a relatively accurate matching initial value.

In this embodiment, by using the UWB positioning positions $X_{T1}$ and $X_{T2}$ corresponding to two adjacent laser point cloud frames given by UWB positioning, a spatial distance between the two positions can be obtained, so that an initial value of the displacement component of pose transformation between the two frames may be obtained:

$$tr = X_{T2} - X_{T1} \quad (12)$$

S3, using UWB data to add constraints to SLAM backend pose graph, and the specific process is as follows:

using the obtained rotation matrix R and displacement vector $t_l$, the UWB base station nodes in the UWB coordinate system are projected into the 3D laser SLAM coordinate system, and the coordinates of each UWB base station node in the 3D laser SLAM coordinate system are obtained;

in the process of exploring indoor areas, UWB tag nodes will communicate with UWB base station nodes in real time.

Figure 5:
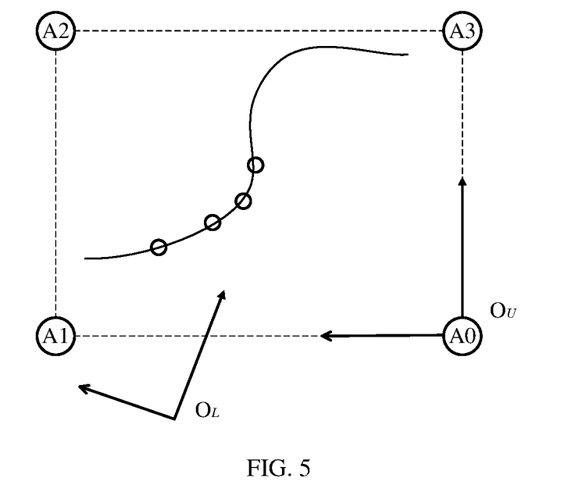
FIG. 5 is a back-end pose graph of SLAM algorithm proposed in an embodiment of the present application.

If the current sensor position is in the envelope surface formed by each UWB base station node (as shown in FIG. 4), the positioning data given by the UWB system will be more accurate. At this time, the positioning position coordinate XUWB calculated by the UWB system is added to the SLAM back-end pose graph as shown in FIG. 5 as a positioning observation constraint:

$$e_1 = \|x_{uwb} - x_t\| \quad (13),$$

in formula (13), $X_t$ is the position component of SLAM key frame pose $P_t$ at time t.

If the position of the current sensor is outside the area of the envelope shown in FIG. 4, it will be handled as follows:

obtaining ranging information; and then, according to the requirements of UWB signal strength threshold and distance threshold between the mobile tag and the base station, filtering the original ranging information:

$$d_t=(d_1,d_2,\ldots d_j)^T \quad (14),$$

in formula (14), $d_t$ represents the measurement distance between the mobile tag node and j valid base station nodes at time t.

As shown in FIG. 5, a nearest base station coordinate $x_{mean}$ measured at time t is added to the back-end pose graph of SLAM as a landmark, and according to a measured distance $d_{mean}$, an observation constraint is constructed for the pose $P_t$ of SLAM key frame at time t, which is used to optimize the back-end map:

$$e_2=\|d_{mean}-\hat{d}\| \quad (15),$$

in which, $$\hat{d}=\|x_{mean}-x_t\| \quad (16),$$

$e_1$ or $e_2$ is the dotted line edge in the pose graph shown in FIG. 5, which represents the UWB observation constraint. In the real-time operation of SLAM algorithm, the back-end pose graph will be optimized at a certain frequency, and the optimized key frame pose will be updated, thus improving the positioning accuracy of SLAM and further improving the accuracy of indoor map construction. And S4, performing loop detection based on curvature feature coding.

Conventional laser SLAM algorithms (such as LeGO-LOAM algorithm) commonly adopts the loop detection method of direct detection: according to a position component $x_{current}$ of the key frame pose $P_{current}$ at the current moment, a target key frame pose $P_{target}$ closest to $x_{current}$ is found in the historical key frame database, and their spatial position distance meets the threshold requirements:

$$\|x_{current}-X_{target}\|\leq d_{th} \quad (17),$$

then, using the key-frame laser point cloud corresponding to the two key frames, the relative pose transformation $T_{measure}$ between the two key frames is obtained by point cloud matching (such as ICP or NDT algorithm), and then $T_{measure}$ is added to the back-end pose graph of the laser SLAM algorithm to form a loop constraint:

$$e_{loop}=\|T_{measure}-T_d\| \quad (18),$$

in which $$T_d=P_{target}^{-1}P_{current} \quad (19),$$

$T_d$ is the relative pose transformation calculated directly by two key frames.

However, the direct detection method adopted by the conventional laser SLAM has the following defects: because the SLAM algorithm has accumulated errors and only depends on the spatial position of the current key frame to find the target key frame, the following situations may occur:

1) the candidate key frame pose $P_{select}$ itself should not be used as the target key frame pose $P_{target}$, but due to the existence of errors, $\|x_{current}-x_{select}\|\leq d_{th}$ is met, which is mistakenly used to construct loop constraints and may further increase the SLAM error; and 2) due to the errors in the pose of key frames, it is impossible to find the candidate historical key frames which should be within the distance threshold according to the current key frame position, and the target key frame which satisfies the formula (13) cannot be found (although it actually exists), so it is impossible to add loop constraints to the back-end pose graph in time to optimize the pose of key frames.

In view of the above defects, this embodiment provides a loop detection method based on curvature feature coding. This method does not depend on the pose of key frames, and only uses the laser point cloud to find suitable candidate historical key frames, so as to compare the similarity of two key frame point clouds, realize the position recognition, and add a reliable loop constraint for SLAM back-end pose graph.

Loop detection based on curvature feature coding includes the following steps:

traversing the key frame point cloud, calculate curvature of each point in this frame point cloud, and mark it as C:

$$C = \frac{\lambda}{|K|\|d_i\|}\left\|\sum_{j\in K, j\neq i}(d_i - d_j)\right\|, \quad (20)$$

in formula (20), K represents the laser point sets located on the left and right sides of the same row as the current laser $point_i$, $r_i$ represents the distance from the point $point_i$ to the lidar center O, $d_j$ represents the distance from other points except $point_i$ in k to the lidar center O, and $\lambda$ represents the scaling coefficient, which is adjusted according to the actual size of the K set, so that the calculated curvature is within a fixed interval, such as [0,10].

Filtering and rounding the curvature according to threshold:

$$C = \begin{cases} 0, & \text{if } C \leq C_{threshold} \\ \text{ROUND}(C), & \text{if } C > C_{threshold} \end{cases}, \quad (21)$$

in formula (21), $C_{threshold}$ is the set threshold.

Figure 6:
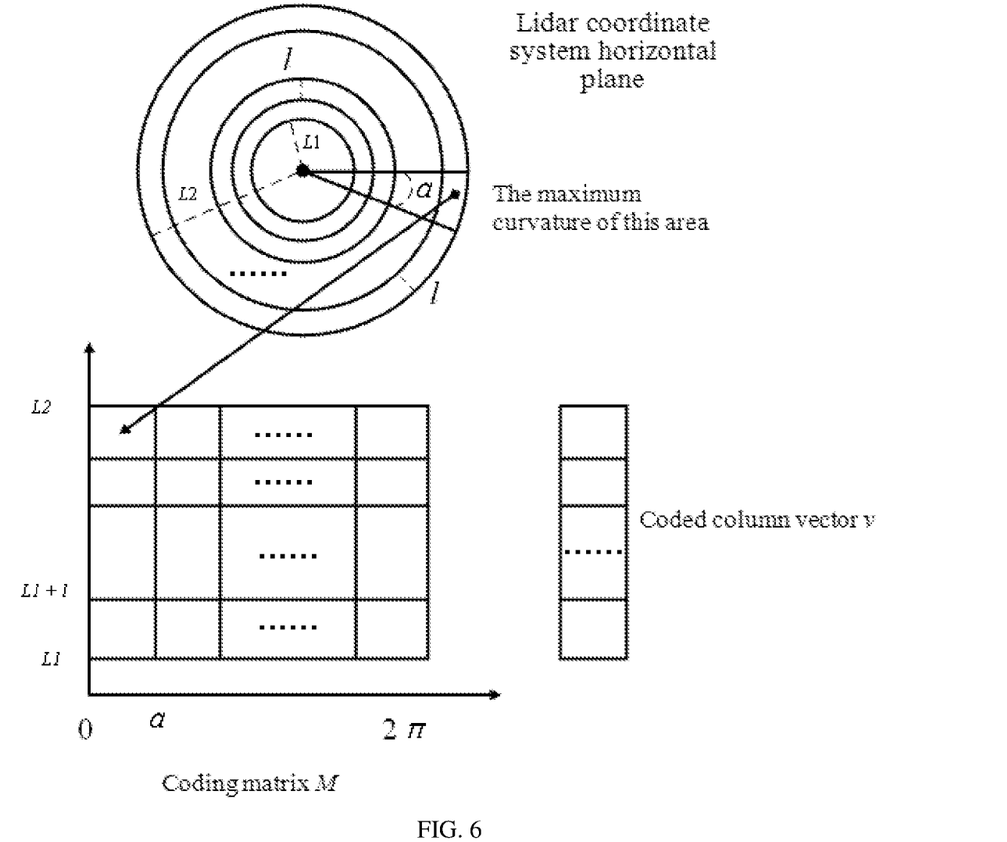
FIG. 6 is a schematic diagram of point cloud feature coding proposed in an embodiment of the present application.

As shown in FIG. 6, this embodiment divides the three-dimensional space where the key frame point cloud is located according to the resolution of the horizontal plane to obtain N sub-areas:

$$N = 2\pi\frac{(L1-L2)}{\alpha l}, \quad (22)$$

in formula (22), L1 and L2 represent the maximum distance and the minimum distance respectively from the lidar center O on the horizontal plane; $\alpha$ is the angular interval, and l is the radial unit length.

As shown in FIG. 6, in this embodiment, a coding matrix M with a specification of $$\frac{2\pi}{\alpha} \times \frac{(L1-L2)}{l}$$

is generated according to the divided spatial regions, and the value of each element of the coding matrix M is the largest curvature value C in the corresponding sub-region, and the sub-region without point clouds is filled in the corresponding position of the matrix with a value of 0.

In a process of performing SLAM algorithm, the corresponding coding matrix M of each generated key frame is stored in the database;

when SLAM algorithm detects whether there is a looping situation according to the current key frame, it searches the coding matrix database of historical key frames for a coding matrix most similar to the coding matrix of the current key frame;

the process includes:

generating an encoding column vector v with the same number of rows for the encoding matrix M, where each element in the vector is the maximum value Cmax of the elements of the corresponding row of the matrix;

when searching candidate matrices in the coding matrix database, first comparing the similarity of column vector v:

$$\text{diff}=\|v_{current}-V_{select}\| \quad (23),$$

in formula (23), $v_{current}$ represents the coding column vector corresponding to the coding matrix of the key frame at the current moment, and $v_{select}$ represents the coding column vector corresponding to the coding matrix of the candidate key frame; when diff is less than the set threshold, the coding matrix $M_{select}$ corresponding to the candidate key frame can be preliminarily selected;

then, it is necessary to determine the number of column shift between $M_{select}$ and the coding matrix $M_{current}$ of the key frame at the current moment; the reason is that when returning to the historically explored area, it may be in a different direction (for example, taking the opposite direction to return to the previously explored area), which results in a certain column shift between the two coding matrices; the elements of the two matrices have the following relationship:

$$M_{select}(i,j)=M_{current}(i,j+\text{shift}) \quad (24).$$

In view of this, the way to calculate shift in this embodiment is to randomly select a column vector from $M_{current}$, and the column in which it is located is marked as $j_{current}$, and then traverse each column vector in $M_{select}$ to find the most similar column vector, and the column in which it is recorded is marked as $j_{select}$ as follows:

$$\text{shift}=j_{select}-j_{current} \quad (25),$$

then translating $M_{select}$ according to shift to obtain $M_{select} \tilde{M}_{select\cdot}$;

comparing the similarity between $M_{select} \tilde{M}_{select\cdot}$ and $M_{current}$;

$$s = \sum_{i} \|\beta_i^{current} - \beta_i^{select}\|, \quad (26)$$

in formula (26), $\beta_i^{current}$ and $\beta_i^{select}$ are one of the column vectors of the corresponding coding matrix; when s meets the condition of being less than the set threshold, it is considered that the key frame point clouds corresponding to the two coding matrices are similar, and the position of the current key frame is close to that of the candidate historical key frame, thus realizing the position recognition function and meeting the condition of adding loop constraint;

carrying out point cloud matching between the current key frame point cloud and the found historical key frame point cloud, and obtaining the relative pose transformation between the two key frame radar coordinate systems, which is added to the SLAM back-end pose graph as a constraint.

The above-mentioned embodiments are only preferred embodiments of the present application, rather than limit the scope of implementation of the present application. Therefore, any changes made according to the shape and principle of the present application should be covered within the scope of protection of the present application.

What is claimed is:

1. An indoor simultaneous localization and mapping (SLAM) method based on three-dimension (3D) lidar and ultra-wide band (UWB), comprising deploying a UWB positioning system in an indoor area, exploring the indoor area through a robot carrying 3D lidar sensors, and generating a map of the explored area by using a SLAM algorithm integrating lidar data and UWB data;

wherein the method specifically comprises the following steps:

S1, determining a relative pose transformation between a 3D laser SLAM coordinate system and a UWB positioning coordinate system;

S2, providing an initial value for inter-frame matching of laser odometer using the UWB data;

S3, adding constraints to SLAM back-end pose graph using the UWB data; and

S4, performing loop detection based on curvature feature coding;

the specific process of determining the relative pose transformation between the 3D laser SLAM coordinate system and the UWB positioning coordinate system in S1 comprises:

S1-1, placing a UWB tag node on a 3D lidar, regarding the two sensors as coincident, and the lidar carrying the two sensors to explore in the indoor environment;

S1-2, using UWB positioning algorithm and SLAM only using laser data, respectively, in the envelope area formed by each UWB base station node, and obtaining coordinate point sets $P_U$ and $P_L$ of the three-dimensional motion trajectory of the sensor in UWB coordinate system (U) and 3D laser SLAM coordinate system (L) before integrating the UWB data into SLAM algorithm:

$$P_U=\{p_k^U=(x_k^U,y_k^U,z_k^U)|k=1,2,3\ldots m\} \quad (1)$$

$$P_L=\{p_k^L=(x_k^L,y_k^L,z_k^L)|k=1,2,3\ldots n\} \quad (2)$$

where in formula (1) and formula (2), $(x_k^U, y_k^U, z_k^U)$ and $(x_k^L, y_k^L, z_k^L)$ are the corresponding three-dimensional motion trajectory coordinate points;

S1-3, in accordance with a same time stamp, uniformly sample p points from the two coordinate points sets of the three-dimensional motion trajectory obtained in the S1-2 to form two point sets as follows: UWB positioning sampling point set $X_U$ and 3D laser SLAM positioning sampling point set $X_L$:

$$X_U = \begin{bmatrix} x_1^U & \ldots & x_p^U \\ y_1^U & \ldots & y_p^U \\ z_1^U & \ldots & z_p^U \end{bmatrix} \quad (3)$$

$$X_L = \begin{bmatrix} x_1^L & \ldots & x_p^L \\ y_1^L & \ldots & y_p^L \\ z_1^L & \ldots & z_p^L \end{bmatrix} \quad (4)$$

wherein in formulas (3) and (4), each column in the matrix is the corresponding coordinate point of the three-dimensional motion track;

S1-4, thinning the two point sets $X_U$; and $X_L$ sampled in the S1-3; and

S1-5, using the two point sets $X_U$ and $X_L$ obtained in the S1-4, according to Umeyama, obtaining the relative pose transformation between UWB coordinate system (U) and 3D laser SLAM coordinate system (L);

the S1-5 comprises:

S1-5-1, finding mean values $X_{U,mean}$ and $X_{L,mean}$ of the two point sets of formulas (3) and (4), and performing coring operation on the two matrices, subtracting the corresponding mean values from each column to obtain corresponding matrices $\overline{X}_U$ and $\overline{X}_L$;

S1-5-2, performing singular value decomposition on the matrix: $\overline{X}_L \overline{X}_U^T$:

$$X_L X_U^T = UDV^T \quad (7)$$

S1-5-3, finding the eigenvalues of matrix: $\overline{X}_L \overline{X}_U^T$, and selecting the corresponding S matrix according to the range of eigenvalues:

$$S = \begin{cases} I & \text{if } \det(\overline{X_L X_U}^T) \geq 0 \\ \text{diag}(1, 1, -1) & \text{if } \det(\overline{X_L X_U}^T) < 0 \end{cases} \quad (8)$$

in formula (8), I is identity matrix; and

S1-5-4, finding the pose transformation between two coordinate systems, comprising a rotation matrix R and a displacement vector $t_l$:

$$R = USV^T \quad (9)$$

$$t_l = x_{U,mean} - R x_{L,mean} \quad (10)$$

projecting a point located in UWB coordinate system to 3D laser SLAM coordinate system:

$$\begin{pmatrix} x_k^L \\ y_k^L \\ z_k^L \end{pmatrix} = R \begin{pmatrix} x_k^U \\ y_k^U \\ z_k^U \end{pmatrix} + t_l, (k = 1, 2, 3...) \quad (11)$$

in accordance with formula (11), obtaining data comprising coordinates of UWB positioning track and coordinates of UWB base station in 3D laser SLAM coordinate system;

the specific process of adding constraints to SLAM back-end pose graph by using UWB data in the S3 comprises:

using the obtained rotation matrix R and displacement vector $t_l$, the UWB base station nodes located in the UWB coordinate system are projected into the 3D laser SLAM coordinate system, and the coordinates of each UWB base station node in the 3D laser SLAM coordinate system are obtained;

in the process of exploring indoor areas, UWB tag nodes communicate with UWB base station nodes in real time;

if the position of the current sensor is in the envelope surface formed by each UWB base station node, a position coordinate $x_{uwb}$) calculated by the UWB system is added to the SLAM back-end pose graph as a positioning observation constraint:

$$e_1 = \|x_{uwb} - x_t\| \quad (13)$$

in formula (13), $x_t$ is the position component of SLAM key frame pose $P_t$ at time t;

if the position of the current sensor is outside the envelope area formed by each UWB base station node, the solution is handled as follows:

obtaining ranging information; and then, according to the requirements of UWB signal strength threshold and distance threshold between the mobile tag and the base station, filtering the original ranging information:

$$d_t = (d_1, d_2, \ldots d_j)^T \quad (14)$$

in formula (14), d represents the measurement distance between the mobile tag node and j effective base station nodes at time t;

a nearest base station coordinate $x_{mean}$ measured at time t is added to the back-end pose graph of SLAM as a road sign, and according to a measured distance $d_{mean}$, an observation constraint is constructed for the pose $P_t$ of SLAM key frame at time t, which is used to optimize the back-end map:

$$e_2 = \|d_{mean} - \hat{d}\| \quad (15)$$

in which, $$\hat{d} = \|x_{mean} - x_t\| \quad (16)$$

$e_1$ and $e_2$ are UWB observation constraints;

the S4 performs loop detection based on curvature feature coding, comprises:

traversing a key frame point cloud, calculating the curvature of each point in this frame point cloud, and marking the curvature as C:

$$C = \frac{\lambda}{|K|\|d_i\|} \left\| \sum_{j \in K, j \neq i} (d_i - d_j) \right\| \quad (20)$$

in formula (20), K represents the laser point set located on the left and right sides of the same row as the current laser point$_i$, $r_i$ represents the distance from the point$_i$ to the lidar center O, $d_j$ represents the distance from the other points except point$_i$ in set K to the lidar center O, and $\lambda$ represents the scale coefficient, which is adjusted according to the actual K set, so that the calculated curvature is within a fixed interval;

filtering and rounding the curvature according to threshold:

$$C = \begin{cases} 0, & \text{if } C \leq C_{threshold} \\ \text{ROUND}(C), & \text{if } C > C_{threshold} \end{cases} \quad (21)$$

in formula (21), is the set threshold;

dividing the three-dimensional space where the key-frame point cloud is located according to the resolution of the horizontal plane to obtain N sub-areas:

$$N = 2\pi \frac{(L1 - L2)}{\alpha l} \quad (22)$$

in formula (22), L1 and L2 represent the maximum distance and the minimum distance from the lidar center O on the horizontal plane respectively; a is the angular interval, and l is the radial unit length;

generating a coding matrix M with a specification of $$\frac{2\pi}{\alpha} \times \frac{(L1 - L2)}{l}$$

according to the divided spatial region, wherein each element value of the coding matrix M is the largest curvature value C in the corresponding sub-region; filling the sub-area without point cloud to the corresponding position of the matrix with the value of 0; wherein
- in the process of SLAM algorithm running, the corresponding coding matrix M of each generated key frame is stored in the database;
- when SLAM algorithm detects whether there is a looping situation according to the current key frame, searching a coding matrix database of historical key frames for a coding matrix most similar to the coding matrix of the current key frame;
- the process comprises:
- generating an encoding column vector v with the same number of rows for the encoding matrix M, wherein each element in the vector is the maximum value $C_{max}$ of the elements of the corresponding row of the matrix;
- when searching candidate matrices in the coding matrix database, first comparing the similarity of column vector v:

$$\text{diff} = \|v_{current} - v_{select}\| \quad (23)$$

in formula (23), $v_{current}$ represents the coding column vector corresponding to the coding matrix of the key frame at the current moment, and $v_{select}$ represents the coding column vector corresponding to the coding matrix of the candidate key frame; when diff is less than the set threshold, the coding matrix $M_{select}$ corresponding to the candidate key frame is preliminarily selected; then, determining the number of column shifts shift between $M_{select}$ and the coding matrix $M_{current}$ of the key frame at the current moment; the way to calculate the shift is to randomly select a column vector from $M_{current}$, where the column is marked as $j_{current}$; and then traversing each column vector in $M_{select}$ to find the most similar column vector, where the column is marked as $j_{select}$, as follows:

$$\text{shift} = j_{select} - j_{current} \quad (25)$$

then translating $M_{select}$ according to shift to obtain $M_{select}$ $\overline{M_{select}}$;

comparing a similarity s of $M_{select}$ $\overline{M_{select}}$ and $M_{current}$ matrices:

$$s = \sum_i \|\beta_i^{current} - \beta_i^{select}\| \quad (26)$$

in formula (26), $\beta_i^{current}$ and $\beta_i^{select}$ are one of the column vectors of the corresponding coding matrices; when s meets the condition that less than the set threshold, it is considered that the key frame point clouds corresponding to the two coding matrices are similar, the position of the current key frame is close to that of the candidate historical key frame, thus realizing the position recognition function and meeting the condition of adding loop constraint;

carrying out a point cloud matching between the current key frame point cloud and the found historical key frame point cloud, obtaining the relative pose transformation between the two key frame radar coordinate systems, and adding the pose transformation to the SLAM back-end pose graph as a constraint.

2. The indoor SLAM method based on 3D lidar and UWB according to claim 1, wherein the specific process of sampling the coordinate point sets $P_U$ and $P_L$ of the three-dimensional motion trajectory according to the time stamp comprises:

adopting linear interpolation method, aiming at the time stamp $t_k$ of each extracted SLAM positioning coordinate point$_L(t_k) \in P_L$, and calculating a corresponding UWB positioning coordinate point$_U(t_k)$ from $P_L$ sampling:

$$\text{point}_U(t_k) = \begin{cases} \text{point}_U(t_d), & |t_d - t_k| \leq t_{min} \\ \text{point}_U(t_1) + \dfrac{\text{point}_U(t_2) - \text{point}_U(t_1)}{(t_2 - t_1)} \times (t_k - t_1), & (t_1 < t_k < t_2) \end{cases} \quad (5)$$

in formula (5), $t_{min}$ is the minimum time difference threshold, and when $|t_d - t_k| \leq t_{min}$ is satisfied, it is considered that time $t_d$ and $t_k$ are close enough; $t_1$ and $t_2$ are two timestamps required by linear interpolation when $t_{min}$ threshold is not met.

3. The indoor SLAM method based on 3D lidar and UWB according to claim 1, wherein UWB positioning positions $X_{T1}$ and $X_{T2}$ corresponding to two adjacent laser point cloud frames given by UWB positioning are used to calculate the spatial distance between the two positions in the S2, so as to obtain an initial value of the displacement component of pose transformation between the two frames:

$$tr = X_{T2} - X_{T1}.$$

\* \* \* \* \*